Dec. 11, 1923.  
F. F. FORSHEE  
1,477,340  
ELECTRIC COFFEE PERCOLATOR  
Filed Dec. 17, 1921
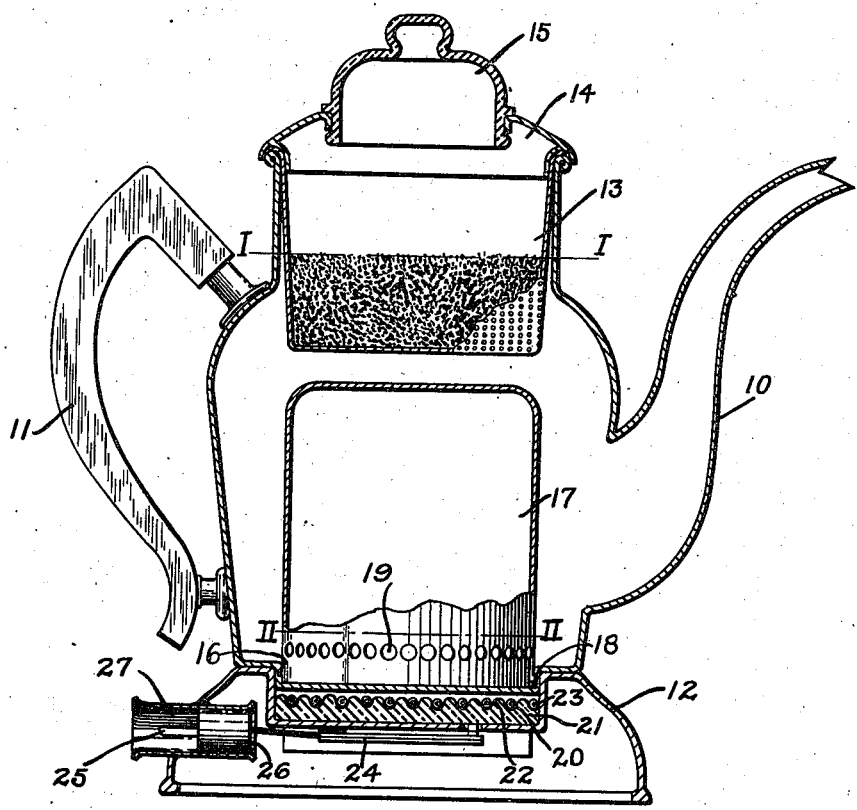
WITNESSES:
INVENTOR  
Frank F. Forshee.  
BY  
ATTORNEY Patented Dec. 11, 1923.

1,477,340

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

ELECTRIC COFFEE PERCOLATOR.

Application filed December 17, 1921. Serial No. 522,967.

*To all whom it may concern:*

Be it known that I, FRANK F. FORSHEE, a citizen of the United States, and a resident of Flint, in the county of Genesee and State of Michigan, have invented a new and useful Improvement in Electric Coffee Percolators, of which the following is a specification.

My invention relates to electrically heated apparatus and particularly to electric fluid heaters, and it has for its object to provide a relatively simple electric percolator of novel construction.

My invention embodies an outer fluid container of usual form having a material container located in the top thereof and an inner member of inverted cup or tubular shape releasably secured to the bottom of the outer container and having a plurality of relatively small openings adjacent the bottom thereof. An electrical heating element is mounted beneath the bottom of the outer container, and a thermal controlling means is located in heat-receiving relation thereto.

The single figure of the drawing is a view, in vertical cross section, of a device embodying my invention.

An outer container 10, which may be of any suitable or desired construction as to material and shape, is provided with a handle member 11 and a base member 12 suitably secured thereto. A material container 13, which is adapted to contain granular or comminuted material, such as coffee, is located in the top of the outer container 10 and is provided with a plurality of openings therein to permit of the fluid flowing therethrough, or the entire member may be of a foraminous material. A cover member 14 for the top of the container may be provided with a glass dome 15 to permit of observing the operation of the percolator.

The bottom of the container 10 is provided with a substantially centrally located circular depression 16. An inner container 17 of substantially inverted tubular or cup shape is releasably secured to the bottom with its lower end located in the depression 16, being maintained in its normal operative position by suitable means, such as a bayonet lock 18. A plurality of relatively small openings 19 is provided in the container 17 adjacent the bottom of the outer container 10 for a purpose to be hereinafter set forth in detail.

An electrical heating element 20 is mounted in the base member 12 in heat-radiating relation to the depression 16 and, as illustrated, may comprise a suitable refractory plate or base 21, having a plurality of grooves 22 therein, in which may be located a suitable resistor member 23. A thermal controlling means is located immediately beneath the heating element 20 and may comprise a suitable thermostatic strip 24 insulatedly mounted on the base 12 and provided with suitable contact members. The thermostatic strip 24 is in heat-receiving relation to the heating element 20 and is connected in series-circuit relation to the resistor 23 and so adjusted that, when the temperature of the thermostatic strip and, therefore, of the heating element proper, exceeds the boiling point of the fluid in the outer container, the thermostat interrupts the circuit through the heating element. While I have illustrated a specific embodiment of a heating element 20, I desire it to be understood that any suitable or desired construction of heating element may be employed, as the heating element proper forms no specific part of my invention.

Suitable contact terminals 25 may be located in an insulating member 26 which may, in turn, be located in a suitable tubular guard member 27 secured to, and projecting through, the base 12 to permit of mounting therein a contact plug (not shown) for energizing the heating element 20, whenever desired.

To operate the device, the inverted cup-shaped member 17 is placed in its proper operative position, substantially as illustrated in the drawing, and the outer container is filled with water to substantially the line I—I, after which the material container 13 and the cover member 14 may be placed in their proper operative positions. The water level in the inverted cup-shaped container 17 will be substantially that indicated by the line II—II of the drawing and, if the heating element 20 is energized, the small quantity of fluid contained in the inner container 17 and in the depression 16 will be heated and a portion thereof vaporized after a predetermined length of time. The air which is entrapped in the member 17 is, of course, also heated. The heated air and the vapor finally cause sufficient pressure in the inverted inner container to force some of the fluid out and through the opening 19, carrying with it a portion of the entrapped air. As this disturbs the fluid located in the container 10 immediately adjacent to the outer surface of the inner container and permits cooler fluid to come in contact with the outer wall of the container, the vapor remaining in the inverted inner container is condensed, thereby causing a partial vacuum which results in refilling the bottom of the inverted container with fluid to a higher level than that indicated by the line II—II in the drawing. The level of the fluid in the outer container is, of course, also correspondingly lower. As the amount of fluid in the bottom of the inner container 17 is relatively greater than at first, a greater period of time is required to generate sufficient vapor and to heat the remaining entrapped air to cause a recurrence of the forcing out of the fluid from the inner container into the outer container. After repeated actions of this character, with continually increasing quantities of fluid drawn into the inner container, substantially all of the air originally entrapped in the inverted container 17 will be carried out with the vapor and the fluid that has been forced out through the openings 19. This result is attained when the temperature of substantially all of the fluid in the percolator has been raised to the boiling point which, of course, prevents a recondensation of the vapor contained in the inverted inner container. At this time, the coffee or other material contained in the material container 13 will be located in substantially boiling fluid to thereby extract the essence thereof. The temperature of the heating element 20 rises rapidly and, as the thermostatic means 24 is so adjusted that it will interrupt the energizing circuit through the heating element at a temperature slightly above the boiling point of the fluid, it interrupts the circuit through the heating element, thus permitting the fluid located in the outer container and the vapor located in the inner inverted container to cool, whereby the vapor is condensed and the fluid is permitted to flow into the inner container 17, thus reducing the level to a height below the bottom of the material container 13, and the operation of percolation is completed.

It may be noted that the device embodying my invention provides a relatively simple percolator comprising relatively few parts which operate according to a novel principle and which provides a thermally controlled means for automatically interrupting the energization of the heating element at the proper point in the process of percolation.

Various modifications may be made in the device embodying my invention without departing from the spirit and scope thereof, and I desire that only such limitations shall be placed thereon as are imposed by the prior art or are specifically set forth in the appended claims.

I claim as my invention:

1. In a percolator, in combination, an outer fluid container, an electric heating element, an inner container in said outer container having a closed upper end and having provision adjacent its lower end for permitting a relatively small quantity of fluid to enter initially from said outer container to be volatilized by said heating element and to be condensed by the surrounding fluid.

2. In a percolator, in combination, an outer fluid container, an inverted inner container inside of said outer container, embodying means in said inner container for permitting a relatively small quantity of fluid to enter initially from said outer container, and an electric heating means for vaporizing a part of said quantity of fluid in said inner container and for causing constantly increasing quantities of fluid to be expelled from, and drawn into, said inner container.

3. In a percolator, in combination, an outer fluid container, an inverted inner container inside of said outer container, embodying means in said inner container for permitting a relatively small quantity of fluid to enter initially from said outer container, and an electric heating means for vaporizing a part of said quantity of fluid in said inner container and for causing fluid to flow recurrently between said inner container and said outer container.

4. In a percolator, in combination, an outer fluid container, an inner closed container secured to the bottom of said outer container and having a plurality of openings therein adjacent the bottom of the outer container, and an electric heating element in heat-conducting relation to said inner container for heating the air and vaporizing the fluid located in said inner container to thereby force out a portion of said air and fluid from said inner container and to permit the recurrent entrance into, and expulsion from, said inner container, of increasing quantities of fluid.

5. In a percolator, in combination, an outer fluid container, a material-containing basket located in the top of said fluid container, an electric heating element located at the bottom of said fluid container, and hollow means located within said fluid container and thermally controlled by said heating element for causing fluid to flow recurrently between said outer container and said hollow means.

6. In a percolator, in combination, an outer fluid container, a material-containing basket located in the top of said fluid container, an electric heating element located at the bottom of said fluid container, and hollow means located within said fluid container and thermally controlled by said heating element for causing fluid to flow recurrently between said outer container and said hollow means until substantially all of said fluid has been heated to its boiling point.

7. In a percolator, in combination, an outer fluid container, a material-containing basket located in the top of said fluid container, an electric heating element located at the bottom of said fluid container, hollow means located within said fluid container and thermally controlled by said heating element for causing fluid to flow recurrently between said outer container and said hollow means until substantially all of said fluid has been heated to its boiling point and thermostatic means for de-energizing said heating means when substantially all of said fluid has been heated to its boiling point.

8. In a percolator, in combination, an outer fluid container, a material-containing basket in the upper end of said container, an electric heating element located at the bottom of said container, a hollow means located in said outer container, secured to the bottom thereof and thermally controlled by said heating element, embodying means in said hollow means for causing fluid to flow recurrently between said outer container and said hollow means when said heating element is energized, and thermostatic means for de-energizing said heating means when substantially all of said fluid has been heated to its boiling point whereby fluid fills substantially all of said hollow means and is operatively disengaged from said material-containing basket.

In testimony whereof, I have hereunto subscribed my name this 23rd day of Nov. 1921.

FRANK F. FORSHEE.